3,459,569
GLASS COMPOSITIONS
James Leslie Ellis, Toledo, Ohio, assignor to Owens-Illinois, Inc., a corporation of Ohio
No Drawing. Filed Sept. 29, 1966, Ser. No. 583,105
Int. Cl. C03c *1/00, 17/00;* C23d *5/00*
U.S. Cl. 106—52                                   7 Claims The present invention relates to novel compositions of matter, and more particularly, the instant invention pertains to glass compositions suitable for sealing and decorating low expansion glass-ceramic materials. An aspect of the invention relates to sealing and decorating borosilicate type glasses.

A need exists for solder glass compositions for joining low-expansion silica-containing surfaces in the glass-to-glass, glass-to-metal and glass-to-ceramic sealing art. Low expansion silica-containing materials generally include low expansion ceramics and glass-ceramics, fused quartz and fused silica, and when used herein, fused quartz and fused silica are to be construed as essentially functional equivalents. The expression "low-expansion glass-ceramic" as used herein generally means a glass-ceramic characterized by a linear thermal coefficient of expansion of about 25 to $30 \times 10^{-7}$ in./in./° C. (0–300° C.) or less. Often in the manufacture of low-expansion silica containing items of science and commerce requiring the fabrication of hermetic seals, technological difficulties are encountered, for example, the difficulties of sealing the solder glass or other sealant to the low expansion surfaces, the marked and pronounced difference of coefficients of thermal expansion between the joinable surfaces and the sealing glass, the inability of the sealing glass to wet the otherwise sealable surface, an excessive temperature requirement of the sealing glass which high temperature may adversely effect the original crystal structure of the glass-ceramic body, the demand for special gaseous atmosphere during the sealing process, seal hairline cracks and the encounterment of other fabrication and use problems. In view of these and other fabrication problems, it will be appreciated by those versed in the art that solder glass compositions which can successfully seal low-expansion silica-containing surfaces would have a definite functional and economic use and would represent a substantial contribution to the instant art. Likewise, it will be further appreciated by those skilled in the art that articles of commerce or the like fabricated with a sealing glass composition essentially free from the tribulations generally associated with the prior art would increase the usefulness of said item in the commercial art.

The sealing art also needs a glass composition suitable for sealing low expansion hard borosilicate glasses having a linear coefficient expansion in the range of about 30 to $40 \times 10^{-7}$ in./in./° C. (0–300° C.). Borosilicate glasses are important in science and commerce for the fabrication of laboratory, television and electronic ware; and, solder glasses applicable for these purposes are therefore of economic import.

Also, a critical need exists for glass compositions capable of effecting durable decoration on low-expansion silica-containing surfaces such as glass-ceramics, borosilicate glass and the like. Decorative designs, lettering or other identification marks and indicia employing glass compositions are conventionally applied to surfaces by silk screening, spraying, rolling, spreading and the like. During the above mentioned processes, technological difficulties are often encountered, for example, the glass composition exhibits poor adhesion, the decorative compositions do not readily bond or adhere to the low expansion surface, the inability to decorate in an air atmosphere, the lack of a durable decoration and the inherent encounterment of other manufacturing problems. Thus, it will be readily appreciated by those knowledged in the subject art that a glass composition useful for decorating low expansion surfaces would represent a contribution to the instant art. Likewise, it will be further appreciated by those versed in the art that glass-compositions suitable for the present purposes and free of the difficulties associated with the prior art would increase the usefulness of the decorated item and have a definite economic asset in the instant art.

Accordingly, it is an object of the present invention to provide new and improved glass compositions.

Another object of the instant invention is to provide novel glass compositions that have desirable chemical and physical properties.

Still another object of this invention is to provide solder glass compositions.

Yet a still further object of the subject invention is to produce glass compositions for sealing low-expansion silica-containing materials.

A still further object of the invention is to provide a sealing glass for sealing low expansion glass ceramics.

A further object of the invention is to provide a sealing glass for sealing fused quartz.

Yet a further object of the present invention is to provide a glass composition for bonding borosilicate type surfaces.

Yet a still further object of the invention is to provide glass decorating compositions.

A still further object of the present invention is to provide glass compositions suitable for decorating low-expansion silica-containing materials.

A further object of the present invention is to provide glass compositions for decorating low-expansion glass ceramics.

It is a further object of the present invention to overcome the difficulties associated with the prior art.

Other objects, features and advantages of this invention will become evident from the following detailed description of the mode and manner of practicing the invention.

In attaining the objects of this invention, it has now been unexpectedly found that the subject glasses with sealing and decorating properties can be obtained by employing glass compositions containing lithium oxide ($Li_2O$), cupric oxide ($Cu_2O$), ferric oxide ($Fe_2O_3$), manganese oxide ($MnO_2$), aluminum oxide ($Al_2O_3$) and silicon oxide ($SiO_2$), in an intimate inventive combination of these components to produce glass compositions with good sealing and decorating properties and with a low thermal coefficient of expansion.

The subject glasses are generally based on the compositional ranges of about 10.0 to 22.0 mole percent $Li_2O$, 5.00 to 12.0 mole percent $Cu_2O$, 0 to 3.0 mole percent $Fe_2O_3$, to 0 to 2.5 mole percent $MnO_2$, 6.0 to 10.0 mole percent $Al_2O_3$ 55.0 to 70.0 mole percent $SiO_2$. The glass compositions of the present invention also include compositions consisting essentially of 10.0 to 22.0 mole percent $Li_2O$, 7.5 to 12 mole percent $Cu_2O$, 1.5 to 2.5 mole percent $Fe_2O_3$, 6 to 10 mole percent $Al_2O_3$ and 55 to 70 mole percent SiO; a glass consisting essentially of 10.0 to 22.0 mole percent $Li_2O$, 7.5 to 12 mole percent $Cu_2O$, 1.5 to 2.5 mole percent $Fe_2O$, 1.5 to 2.5 mole percent MnO, 6 to 10 mole percent $Al_2O_3$ and 55 to 70 mole percent $SiO_2$; and a glass consisting essentially of 10.0 to 22.0 $Li_2O$, 7.5 to 12 mole percent $Cu_2O$, 1.5 to 2.5 mole percent MnO, 6 to 10 mole percent $Al_2O_3$, and 55 to 70 mole percent $SiO_2$. Generally the coefficient of expansion for the subject glasses will be about 15 to $25 \times 10^{-7}$ in./in./° C. (0–300° C.), with the now preferred range of about 16 to $23 \times 10^{-7}$ in./in./° C. (0–300° C.).

Generally, the borosilicate glass compositions that can be employed within the mode and manner of the present invention are the borosilicate glasses well-known to the prior art and they are disclosed for example in "Technical Glasses" by M. P. Volf, pages 129 to 154, published by Sir Issac Pitman and Sons, Ltd., London, and in the U.S. Patent No. 1,304,623. Exemplary of borosilicate glasses listed in the above references are the borosilicate glasses of the broad compositional range comprising 70 to 90 weight percent $SiO_2$, 5 to 20 weight percent $B_2O_3$, 1 to 6 weight percent $Al_2O_3$ and 1 to 4 weight percent $Na_2O$. Exemplary of specific borosilicate glasses disclosed within the instant cited references are the borosilicate glasses consisting of 80.6 weight percent $SiO_2$, 13.0 weight percent $B_2O_3$, 2.2 weight percent $Al_2O_3$, 4.1 weight percent $Na_2O$ and 0.05 weight percent $Fe_2O_3$; a glass consistency of 80.9 weight percent $SiO_2$, 12.9 weight percent $B_2O_3$, 1.8 weight percent $Al_2O_3$ and 4.4 weight percent $Na_2O$; and a borosilicate glass consisting of 80.0 weight percent $SiO_2$, 11.9 weight percent $B_2O_3$, 2.17 weight percent $Al_2O_3$, 4.2 weight percent $Na_2O$ and 0.6 weight percent $K_2O$ and the like.

Exemplary of the low expansion glass-ceramics having a coefficient of expansion of about $25 \times 10^{-7}$ in./in./° C. (0–300° C.) or less are a glass-ceramic consisting of, in weight percent 69% $SiO_2$, 19% $Al_2O_3$, 4% CaO, 3.8% $Li_2O$, 1.8% $TiO_2$, 2% $ZrO_2$, 0.1% $Na_2O$ and 0.3% $Sb_2O_3$ with a heat treatment period at 1375° for 480 hours with an expansion of $0.6 \times 10^{-7}$ in./in./° C. (0–300° C.); a glass ceramic consisting essentially of 69.9% $SiO_2$, 18% $Al_2O_3$, 4% CaO, 4% $Li_2O$, 3.5% $ZrO_2$, 0.1% $Na_2O$, and 0.2% $Sb_2O_3$ with a thermal coefficient of $0.5 \times 10^{-7}$ in./in./° C. (0–300° C.); and a composition consisting of 64.1% $SiO_2$, 20.9% $Al_2O_3$, 2.7% CaO, 3.7% $Li_2O$, 1.8% $TiO_2$, 2% $ZrO_2$, 0.5% $Na_2O$, 2.9% $B_2O_3$, 1.3% ZnO and 0.1% $As_2O_3$ with an annealing point for the glass of 1225° F., a heat treatment period of 64 hours at 1325° F. with a coefficient of expansion of $3.1 \times 10^{-7}$ in./in./° C. (0–300° C.), and ceramics disclosed in Netherlands patent application No. 6,503,460 and other like low expansion glass-ceramics. The above mentioned glass-ceramics are cited as exemplary and are not to be construed as limiting, as other suitable materials known to those versed in the art may be used within the mode and manner of the subject invention.

In preparing the novel sealing and decorating glasses of disclosed compositional range and batch ingredients are intimately mixed by hand or in a commercially available blender and heated to such temperatures so that all of the glass forming substances are present in the liquid state, thereby enabling the formation of a glass from a homogenous melt.

Generally, the batch ingredients were mixed well by hand and melting was done in a 90% platinum 10% rhodium crucible in an electric furnace at about 2900 to 3000° F., for about 2 to 5 hours in an air atmosphere containing about 0.5% $O_2$. The batch ingredients were continuously stirred during the melting and heating procedure.

The batch materials employed for preparing the glasses of the invention were of a high purity and were selected from the following commercially available materials: $SiO_2$, Kona Quintus Quartz, $Al_2O_3$ Alcoa A–14, lithium carbonate, ferric oxide, cupric oxide and manganese oxide. Of course, the glasses of the present invention may be in the form of functionally equivalent oxides, carbonates, fluorides, silicates, or any other form which does not disturb or adversely affect the subject glass composition.

The following examples are representative of embodiments of glass compositions of the present invention and these examples are not to be construed as limiting as other obvious embodiments will be readily apparent to those versed in the art.

Example 1

A sealing glass composition having a theoretical analysis of 17.0 weight percent $Cu_2O$, 4.1 weight percent $Fe_2O_3$, 6.5 weight percent $Li_2O$, 9.5 weight percent $Al_2O_3$ and 62.9 weight percent $SiO_2$, was prepared by intimately blending 3,147 grams of Kona Quintus Quartz, 476 grams of A–14 alumina, 813 grams of lithium carbonate, 206 grams of ferric oxide and 943 grams of Calumet Hi-Cupric. The latter reagent is 78% copper, which copper consisting of 66.8% CuO and 30% $Cu_2O$. The substantially homogenous mixture was melted in an electrically heated furnace while contained in a commercially available fused silica crucible. The melting and fining procedures were conducted by heating at 2900° F., for 4 hours and 10 minutes in an 0.5% $O_2$ atmosphere. Thereafter, the glass was poured out of the container and fritted in a conventional manner.

Example 2

A glass composition of the present invention having a theoretical composition by weight of 6.8 percent $Li_2O$, 17.6 weight percent $Cu_2O$, 4.2 weight percent $Fe_2O_3$, 13.3 weight percent $Al_2O_3$ and 58.1 weight percent $SiO_2$ was prepared by mixing 2910 grams of Ottawa sand, number 290, 667 grams of A–14 Alumina, 850 grams of lithium carbonate, 211 grams of ferric oxide and 977 grams of Calumet Hi-Cupric which consists of 78% copper, the copper consisting of 66.8% CuO and 30% $Cu_2O$, to a substantially homogenous mixture. After mixing, the batch was melted and fined at 2900° F., for 2 hours and 20 minutes in a fused silica crucible, with constant stirring in a 0.5% $O_2$ atmosphere. Thereafter, the glass was poured and fritted in the conventional manner.

Example 3

Following the procedure of Example 1, a glass composition of the instant invention characterized by a theoretical composition by weight of 9.1 percent $Li_2O$, 23.6 percent $Cu_2O$, 5.7 percent $Fe_2O_3$, 13.1 percent $Al_2O_3$ and 48.5 percent $SiO_2$ was prepared by blending 2429 parts by weight of Ottawa sand No. 290, 657 parts by weight of A–14 Alumina, 1138 parts by weight of lithium carbonate, 286 parts by weight of ferric oxide and 1310 parts by weight of Calumet Hi-Cupric (a commercially available copper mixture of 30% $Cu_2O$ and 66.8% CuO) to obtain a homogenous mixture. Melting and fining was preformed at 2900° F., in a fused silica crucible, with constant stirring and a 0.5% $O_2$ atmosphere. The glass was finally poured and flaked by conventional, standard flaking techniques.

Example 4

A solder glass composition consisting of a theoretical composition by weight of 21.5 percent $Cu_2O$, 5.2 percent $Fe_2O_3$, 8.3 percent $Li_2O$, 12.0 percent $Al_2O_3$ and 53.0 percent $SiO_2$ was prepared by rolling and blending 2652 grams of Kona Quintus Quartz, 601 grams of A–14 Alumina, 1037 grams of lithium carbonate, 261 grams of ferric oxide and 1193 grams of Calumet Hi-Cupric (a commercially available reagent which analyzes as 78% copper wherein said copper consists of 30% $Cu_2O$ and 66.8% CuO), to produce a homogenous intimately blended mixture. The melting and fining of the batch was carried out at 2900° F., in a fused silica crucible, with constant stirring, for 3 hours and 30 minutes in slight excess of oxygen, 0.5%. The glass was poured and fritted by conventional, standard flaking techniques.

Example 5

A glass forming batch consisting of 2925.2 grams of sand, Ottawa No. 290, 704.9 grams of A–14 Alumina, 812.5 grams of lithium carbonate, 937.8 grams of Calumet Hi-Cupric and 206.0 grams of ferric oxide were intimately blended in a commercially available V-blender to effect a homogenous mixture. Melting and fining was carried out for the batch in a fused silica crucible at 2900° F. The batch was heated at the stated temperature for 3 hours and 30 minutes, with constant stirring. The atmosphere was 0.5% $O_2$. The theoretical composition for the subject glass is 6.5 weight percent $Li_2O$, 16.9 weight percent $Cu_2O$, 4.1 weight percent $Fe_2O_3$, 14.1 weight percent $Al_2O_3$ and 58.4 weight percent $SiO_2$.

In the Table 1 immediately below is further defined glass compositions of the subject invention made according to the mode and manner of the instant invention. The oxide ingredients and physical characteristics of the various subject glasses are expressed from the theoretical composition, in mole percent, based on the batch materials.

TABLE 1.—GLASS COMPOSITION

| | Example | | | |
|---|---|---|---|---|
| | 6 | 7 | 8 | 9 |
| Oxides: | | | | |
| $Li_2O$ | 19.01 | 14.48 | 21.12 | 14.78 |
| $Cu_2O$ | 10.29 | 7.91 | 11.45 | 7.98 |
| $Fe_2O_3$ | 2.23 | 1.71 | 2.48 | 1.75 |
| $Al_2O_3$ | 8.07 | 6.21 | 8.93 | 9.41 |
| $SiO_2$ | 60.40 | 69.69 | 56.02 | 66.08 |
| Gradient boat: | | | | |
| Glassy edge (° F.) | 1,600 | 1,690 | 1,634 | |
| Melting point (° F.) | 1,714 | 1,718 | 1,711 | |
| Coefficient of expansion (0–300) | 20.4 | 16.9 | 23.1 | |

The glass compositions of the instant invention are used as solder glasses for assemblying low-expansion silica-containing surfaces by conventional methods known to the art. The sealing glasses can be applied by both the hot and cold techniques. When the cold procedure is employed, the solder glass composition is ground and mixed with a suitable vehicle to form a paste. One acceptable vehicle is composed of about 1 to 3%, usually about 1 to 2% nitrocellulose in amyl acetate. Other acceptable organic binders or vehicles may be employed provided they will readily burn off and volatize during the heating procedure of the sealing of the preformed parts. In addition, the organic binder should not react with any of the elements making up the bonded assembly. As examples of other organic binders which can be used include gelatine dissolved in water, nitrocellulose and butylacetate, camphor with cellulose and the like.

The solder glass composition, mixed with the vehicle can be manually or mechanically applied by using a spatula, extrusion, cold dip, brush, roller coat, spray, doctor blade or any like means. In the extrusion technique, a toothpaste-like mixture of solder glass and carrier can be used to hold and dispense a uniform layer along the sealing edge.

After coating, with the sealing glass composition of the instant invention and employing any of the sealing techniques discussed supra, the coated parts can be dried in an oven or by any suitable heating procedure. The dry assembled parts are then intimately bonded in an oven and finally cooled to room temperature.

While the above described examples are seen to illustrate the application of the sealing glass composition before the heating step, it is to be understood that the preformed parts to be assembled could be preheated, dipped and then fired.

Generally, when the hot method of application is employed, the solder glass composition is first melted in a suitable container, such as a platinum or fused silica crucible or the like, to a temperature above the working point followed by dipping the preheated, preformed parts into the molten solder glass and then allowing the assembly to set for a few seconds. After the thus treated parts have slightly cooled, they are aligned for assembly and sealed in an oven heated to the sealing temperature.

The above examples are illustrative of sealing techniques, and, it is to be understood that the sealing procedures disclosed herein are not intended to limit the instant disclosure, as other techniques will be obvious to those versed in the subject art.

The following examples are illustrative of the present invention and are not to be considered as limiting the spirit and scope of the invention in any manner, as these and other variations will be readily apparent to those versed in the subject art.

Example 10

Two pieces of a glass-ceramic composition wherein said composition consist essentially of 68.0 weight percent $SiO_2$; 19.3 weight percent $Al_2O_3$; 3.6 weight percent $Li_2O$; 3.9 weight percent ZnO; 1.4 weight percent $ZrO_2$; 1.8 weight percent $TiO_2$; 1.5 weight percent $P_2O_5$; .2% weight percent $F_2$; .3% weight percent $Cl_2$; .5% weight percent $Na_2O$; .5% weight percent $Sb_2O_3$ with a heat treatment period of 0 to 1300 F., at 150° F. per hour 1350 to 1550° F. at 50° F. per hour, 1550 to 1850° F. at 150° per hour, then held at 1850 for 1 hour cool at 300° F. per hour, with an expansion of $0\pm5\times10^{-7}$ (0–300° C.) were sealed by applying a solder glass composition wherein said latter composition consist of a finely ground glass of 19.01 mole percent $Li_2O$, 10.29 mole percent $Cu_2O$, 2.23 mole percent $Fe_2O_3$, 8.07 mole percent $Al_2O_3$ and 60.40 mole percent $SiO_2$ intimately dispersed in a nitrocellulose—amyl acetate vehicle to one of the glass-ceramic surfaces to be sealed and then the second glass-ceramic surface was placed in positional contact to the solder glass coated glass-ceramic surface. Any excess solder glass was wiped off and the assembled parts were placed in an oven to dry. The oven temperature was approximately 190° F. The glass-ceramic solder glass assembly were next placed in a furnace and fired for 1 hour. The firing temperature was about 1550° F. The samples were allowed to cool in the furnace to about 800° F. before they were cooled to room temperature. The sealing was successful and the solder glass exhibited good working properties.

Example 11

Following the procedure outlined in Example 10 glass-ceramic preformed parts were sealed at 1600° F., 1650° F., 1700° F., and 1750° F., and good seals were fabricated at the stated temperatures. All other conditions and sealing compositions were as described supra.

Example 12

Two pieces of glass-ceramics, having a composition consisting essentially of 66.2 weight percent $SiO_2$; 20.9 weight percent $Al_2O_3$; 4.0 weight percent $Li_2O$; 2.0 weight percent $ZrO_2$; 1.8 weight percent $TiO_2$; 1.2 weight percent ZnO; 2.7 weight percent CuO; 0.2 weight percent $K_2O$; 0.3 weight percent $Cl_2$; 0.6 weight percent $Na_2O$ and 0.3 weight percent $Sb_2O_3$ which were subjected to a heat treatment period at 1425° F., for 64 hours and which possessed a coefficient of thermal expansion of $0.5\times10^{-7}$ in./in./° C. (0–300°) were sealed by applying a solder glass composition consisting essentially of 14.78 mole percent $Li_2O$, 7.98 mole percent $Cu_2O$, 1.75 mole percent $Fe_2O_3$, 9.41 mole percent $Al_2O_3$, and 66.08 mole percent $SiO_2$ dispersed in an organic nitrocellulose-amyl acetate carrier to one of the glass-ceramic sealable surfaces, and then placing the second sealable glass-ceramic surface in initimate contact with the solder glass coated glass-ceramic surface. Any excess solder glass was wiped off and the assembled parts were placed in an oven to dry. The oven temperature was about 190° F. The assembled parts were next placed in a furnace and fired for 1 hour at 1550° F. to effect bonding of the sealable surfaces. The intimately bonded assembly was allowed to cool in the furnace to about 800° F. before removing to room temperature. The solder glass demonstrated good working properties and the good seals were effected.

Example 13

Following the procedure of Example 12, glass-ceramic preformed parts were sealed at 1600° F., 1650° F., 1700° F., and 1750° F.; all other conditions and compositions were as discussed supra. Good seals were fabricated at these temperatures.

Example 14

Two flat circular glass-ceramic plates of about 6 inches diameter were intimately bonded by a solder glass composition consisting of 21.12 mole percent $Li_2O$, 11.45 mole percent $Cu_2O$, 2.48 mole percent $Fe_2O_3$, 8.93 mole percent $Al_2O_3$ and 56.02 mole percent $SiO_2$. The solder glass ground and mixed with a nitrocellulose-amyl acetate vehicle for ease of application to the preformed sealable parts. The solder glass vehicle mixture was applied to both the bottom and the top outer circular edges of the glass-ceramic plates, the plates were then positioned and fired in an oven at 1550° F. for 1 hour to effect bonding of the glass-ceramic solder glass surfaces. After the one hour firing period, the intimately bonded parts were permitted to cool in the furnace to about 850° F., and then removed from the furnace. The glass-ceramic parts were successfully sealed employing the instant sealing glass. The glass-ceramic plates were fabricated from a composition consisting essentially of 70.2 weight percent $SiO_2$; 17.0 weight percent $Al_2O_3$; 3.5 weight percent $Li_2O$; 1.8 weight percent $TiO_2$; 1.4 weight percent $ZrO_2$; 1.5 weight percent $P_2O_5$; 4.0 weight percent MgO; 0.2 weight percent $F_2$; 0.5 weight percent $Na_2O$ and .2 weight percent $Sb_2O_3$ with a heat treatment period for 0 to 1300° F., at 425° F. per hour from 1300 to 1500° F. at 100° F. per hour, from 1500° to 2000° F. at 200° F. per hour, held 2000° F. for 1 hour, cool to room temperature, with an expansion of $14 \times 10^{-7}$ (3–300 C.).

Example 15

A section of glass-ceramic tubing consisting essentially of 68.0 weight percent $SiO_2$; 19.3 weight percent $Al_2O_3$; 1.8 weight percent $TiO_2$; 1.4 weight percent $ZrO_2$; 3.9 weight percent ZnO; 3.6 weight percent $Li_2O$; 1.5 weight percent $P_2O_5$; 0.5 weight percent $Na_2O$; 0.2 weight percent F and 0.5 weight percent $Sb_2O_3$ and heat treatment as in Example 10, was joined to a flat glass-ceramic plate consisting essentially of 66.2 weight percent $SiO_2$; 20.9 weight percent $Al_2O_3$; 1.8 weight percent $TiO_2$; 2.0 weight percent $ZrO_2$; 1.2 weight percent ZnO; 4.0 weight percent $Li_2O$; 2.7 weight percent CuO; 0.2 weight percent $K_2O$; 0.6 weight percent $Na_2O$; 0.3 weight percent Cl; and 0.3 weight percent $Sb_2O_3$ with a heat treatment period as defined in Example 12 by employing a paste-like mixture of a powdered solder glass consisting essentially of 21.12 mole percent $Li_2O$, 11.45 mole percent $Cu_2O$, 2.48 mole percent $Fe_2O_3$, 8.93 mole percent $Al_2O_3$ and 56.02 mole percent $SiO_2$ dispersed in a nitrocellulose amyl acetate vehicle. The seal was fabricated as a firing temperature of 1550° F. with a holding time of 1 hour. The seals were allowed to cool in the furnace to about 850° F., before removing.

Example 16

Following the procedure of Example 14, good seals were made with a solder glass consisting essentially of 14.48 mole percent $Li_2O$, 7.91 mole percent $Cu_2O$, 1.71 mole percent $Fe_2O_3$, 6.21 mole percent $Al_2O_3$ and 69.69 mole percent $SiO_2$. The firing temperature was 1550° F. and the holding time 1½ hours. All other techniques and the glass-ceramic were described supra. Good seals were effected employing the instant solder glass.

Example 17

Two pieces of rod, ⅜″ in diameter and made of a glass consisting essentially of 80.6 weight percent $SiO_2$, 13.0 weight percent $B_2O_3$, 2.2 weight percent $Al_2O_3$ and 4.1 weight percent $Na_2O$ were joined together by a sealing glass composition consisting essentially of 19.01 mole percent $Li_2O$, 10.29 mole percent $Cu_2O$, 2.23 mole percent $Fe_2O_3$, 8.7 mole percent $Al_2O$ and 60.40 mole percent $SiO_2$. The sealing glass was applied to the end of the rods and sealing was effected using an infrared furnace. Good seals were obtained by this procedure. The solder glass was applied in powdered glass form mixed with a vehicle composed of 1.2% by weight of nitrocellulose in amyl acetate to form a paste.

Example 18

A copper glass consisting essentially of 19.01 mole percent $Li_2O$, 10.29 mole percent $Cu_2O$, 2.23 mole percent $Fe_2O_3$, 8.07 mole percent $Al_2O_3$ and 60.40 mole percent $SiO_2$ was powdered and mixed with an organic vehicle composed of 1.2% by weight of nitrocellulose in amyl acetate to form a paste. The paste was applied to the butt ends of two glass rods which rods were made from a glass consisting of 80.6 weight percent $SiO_2$, 13.0 weight percent $B_2O_3$, 2.2 weight percent $Al_2O_3$ and 4.1 weight percent $Na_2O$. Next, the pasted butt ends were contacted and dried in an oven for 1 hour. Following the drying of the parts, the assembly was placed under an I.R. heating lamp for about 1 minute, and when melting of the solder glass was evident, the samples were placed in an oven at 1200° F. and allowed to slowly cool. Seals made by this procedure exhibited a stress of approximately 300 p.s.i.

Example 19

A piece of borosilicate glass tubing was decorated with pipette graduation employing a subject glass consisting essentially of 19.0 mole percent $Li_2O$, 10.29 mole percent $Cu_2O$, 2.23 mole percent $Fe_2O_3$ 8.07 mole percent $Al_2O_3$ and 60.4 mole percent $SiO_2$. The above glass was powdered to about 140 mesh, mixed with 7 grams of commercially available squeeze oil, screened onto the glass tubing and fired in an I.R. furnace for 35 seconds to effect decoration of the pipette graduation onto the tubing substrate.

Example 20

A piece of flat low expansion glass-ceramic was decorated by screening the composition of Example 19 onto ceramic surface and for 10 minutes at 1800° to effect decoration of the ceramic substrate. The decoration had good gloss and was dark purple.

Example 21

The procedure employed in Example 19 was followed except for the firing temperature. In this decoration, a temperature of 1900° F. was employed and produced a coppery color decoration.

Example 22

Glass-ceramic surfaces of the low expansion type were decorated by applying decorating compositions consisting of 14.5 mole percent $Li_2O$, 7.9 mole percent $Cu_2O$, 1.7 mole percent $Fe_2O_3$, 6.2 mole percent $Al_2O_3$ and 69.7 mole percent $SiO_2$ to the ceramic substrate. The decorating glass was powdered, mixed with a squeeze oil and screened onto the ceramic substrate. The firing cycle of 2 hours at 1330° plus 1 hour at 1500°, plus used was 1 hour at 1550 and ½ hour.

The gradient boat test results as disclosed above was conducted in a gradient furnace having a temperature range of 950° F. to 1950° F. over a ten inch span boat. A ten-inch boat is filled with a fritted glass and placed into the furnace for one hour. The temperature is measured at about one inch intervals over the boat every five minutes before removal to establish the temperature gradient. After cooling, the glassy and melting edges of the sample are measured and recorded.

The glass compositions of the present invention can be employed to manufacture items of science and commerce. For example, the sealing glasses can be used to join preformed glass-ceramic parts to manufacture stove plates, electric glass-ceramics switches and the like. The glass compositions can also be used to decorate glass-ceramic heating utensils, laboratory glass ware and other like items.

While the illustrative embodiments of the invention have been described with particularity, it will be understood that various modifications will be apparent and can readily be made by those skilled in the art without departing from the scope and spirit of the invention.

I claim:
1. A solder glass compositions wherein said composition consists essentially of 10 to 22 mole percent $Li_2O$, 5 to 12 mole percent $Cu_2O$, 0 to 3 mole percent $Fe_2O_3$, 0 to 2.5 mole percent $MnO_2$, 6 to 10 mole percent $Al_2O_3$ and 55 to 70 mole percent $SiO_2$.
2. A glass composition according to claim 1 wherein said glass consists essentially of 10 to 22 mole percent $Li_2O$, 7.5 to 12 mole percent $Cu_2O$, 1.5 to 2.5 mole percent $Fe_2O_3$, 6 to 10 mole percent $Al_2O_3$ and 55 to 70 mole percent $SiO_2$.
3. A glass composition according to claim 1 wherein said glass consists essentially of 10 to 22 mole percent $Li_2O$, 5 to 12 mole percent $Cu_2O$, 1.5 to 2.5 mole percent $Fe_2O_3$, 1.5 to 2.5 mole percent $MnO_2$, 6 to 10 mole percent $Al_2O_3$ and 55 to 70 mole percent $SiO_2$.
4. A glass composition according to claim 1 wherein said glass consists essentially of 10 to 22 mole percent $Li_2O$, 7.5 to 12 mole percent $Cu_2O$, 1.5 to 2.5 mole percent $MnO_2$, 6 to 10 mole percent $Al_2O_3$ and 55 to 70 mole percent $SiO_2$.
5. A glass composition according to claim 1 wherein said glass consists essentially of 19 mole percent $Li_2O$, 10 mole percent $Cu_2O$, 2 mole percent $Fe_2O_3$, 8 mole percent $Al_2O_3$, and 61 mole percent $SiO_2$.
6. A glass composition according to claim 1 wherein said glass consists essentially of 15 mole percent $Li_2O$, 8 mole percent $Cu_2O$, 1.5 mole percent $Fe_2O_3$, 6 mole percent $Al_2O_3$ and 69.5 mole percent $SiO_2$.
7. A glass composition according to claim 1 wherein said glass consists essentially of 21 mole percent $Li_2O$, 11.5 mole percent $Cu_2O$, 2.5 mole percent $Fe_2O_3$, 9 mole percent $Al_2O_3$ and 56 mole percent $SiO_2$.

References Cited
UNITED STATES PATENTS
3,414,465  12/1968  Baak _____ 106—52 X

TOBIAS E. LEVOW, Primary Examiner

M. L. BELL, Assistant Examiner

U.S. Cl. X.R.
65—43, 60; 161—192

UNITED STATES PATENT OFFICE
CERTIFICATE OF CORRECTION

Patent No. 3,459,569     Dated August 5, 1969

Inventor(s) James Leslie Ellis

It is certified that error appears in the above-identified patent and that said Letters Patent are hereby corrected as shown below:

Column 2, line 57 "to" (first occurrence) should be deleted; line 58 after "$Al_2O_3$" --and-- should be inserted; line 63 "SiO" should be --$SiO_2$--. Column 9, line 10 "compositions" should be --composition--.

SIGNED AND SEALED

MAR 10 1970

(SEAL)
Attest:

Edward M. Fletcher, Jr.
Attesting Officer

WILLIAM E. SCHUYLER, JR.
Commissioner of Patents